Jan. 17, 1933. F. KREJCI 1,894,773
AUTOMATIC CHUCK OPERATING DEVICE
Filed Aug. 31, 1931 2 Sheets-Sheet 1
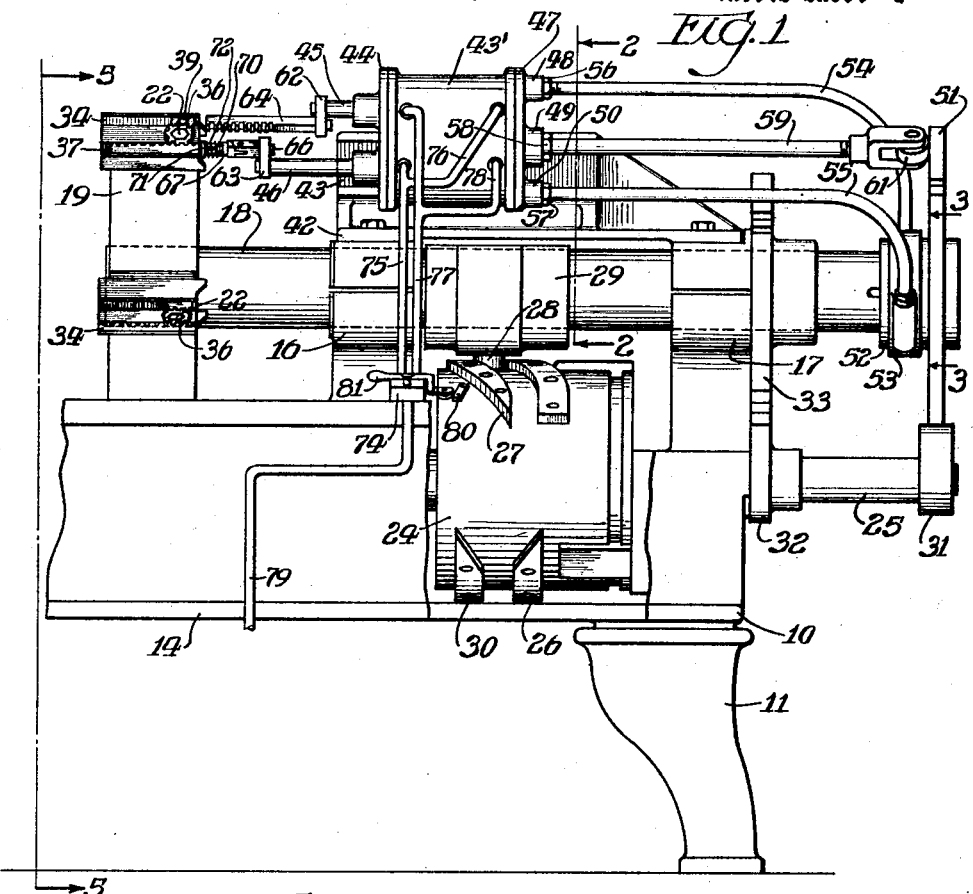
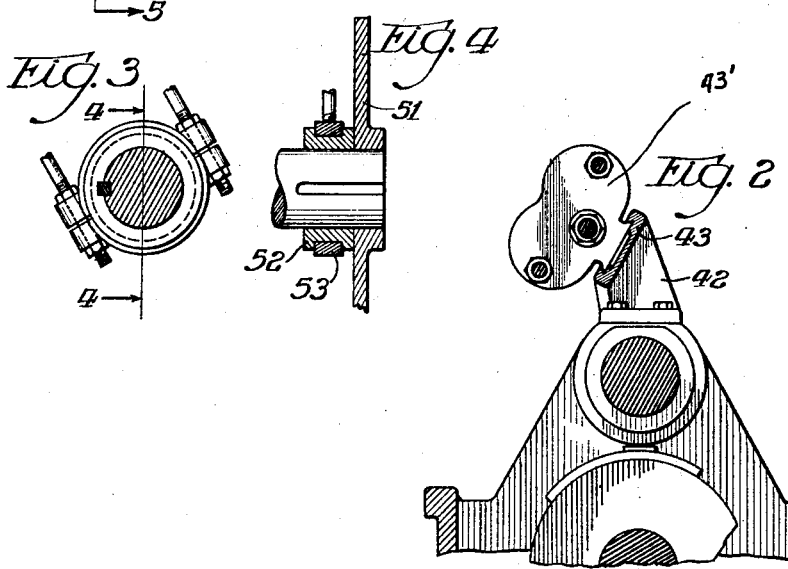
Inventor
Frank Krejci
John H Brezina atty.

Jan. 17, 1933.  F. KREJCI  1,894,773
AUTOMATIC CHUCK OPERATING DEVICE
Filed Aug. 31, 1931  2 Sheets-Sheet 2
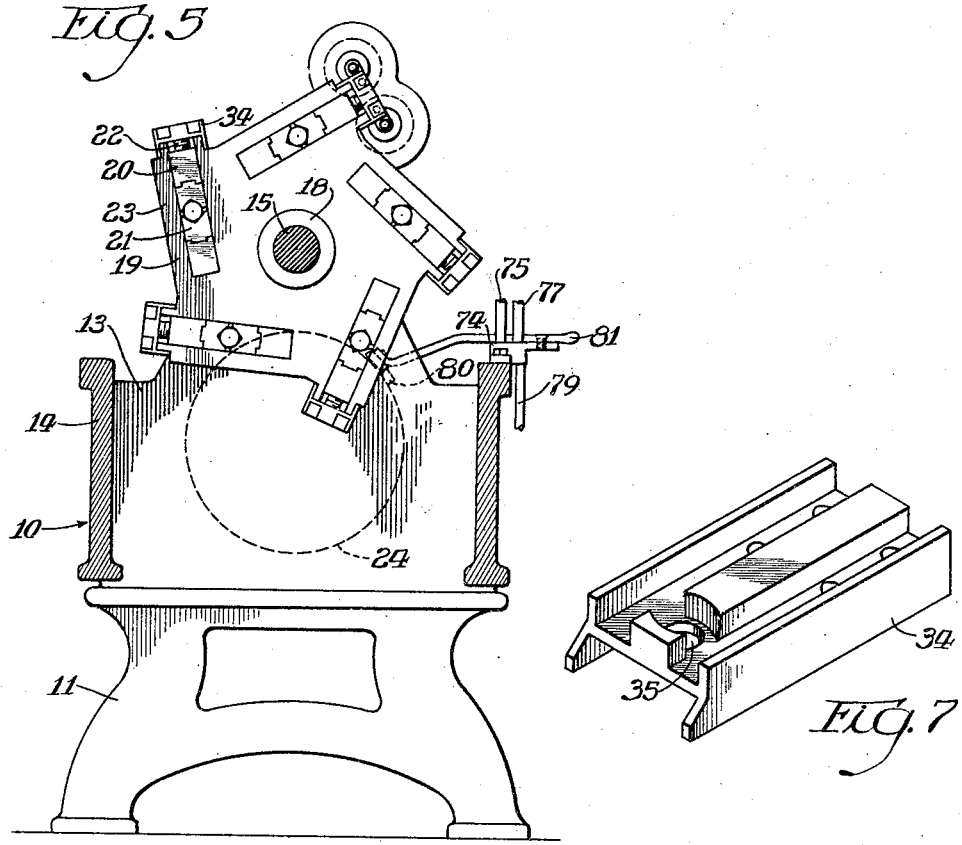
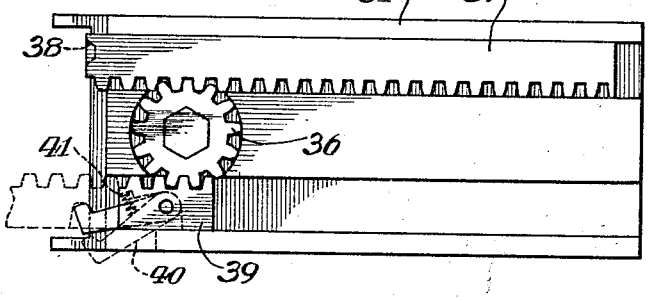
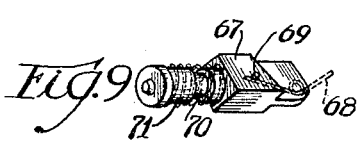 
Inventor
Frank Krejci
John F Brezina Atty.

Patented Jan. 17, 1933

1,894,773

UNITED STATES PATENT OFFICE

FRANK KREJCI, OF CHICAGO, ILLINOIS

AUTOMATIC CHUCK OPERATING DEVICE

Application filed August 31, 1931. Serial No. 560,311.

This invention relates to a device adapted to be attached to the standard types of screw and chucking machines having rotatable chucks for providing air driven means to quickly open the respective chuck jaws before the article being machined is mounted in the jaws and to release the same after it has passed through its cycle of operations.

My device particularly comprises two opposed slidable rack bars on opposite sides of a pinion which is mounted about the head of each chuck screw of the chuck, and slidable cylinders and air driven pistons having means adapted to selectively move said rack bar to rotate each chuck screw into the position desired by the operator.

An object of my invention is the provision of a device adapted to be attached to a standard screw or chucking machine to quickly rotate the chuck screw by compressed air means to expedite removal and insertion of a new article which is to pass through the cycle of operations as the chuck rotates.

A further important object of my invention is the provision of a device which eliminates the necessity of turning the chuck screw by means of a crank or wrench when each respective set of chuck jaws is at upper neutral position where the machined article is being removed and a new one is placed therein for machining, and which provides quick air driven means to rotate the chuck screw to release the jaws and also to lock the same when a new blank is placed in position therein.

A further object of my invention is the provision of a device having two compressed air cylinders which are connected to a two-way valve, said cylinders having pistons and piston rods and means driven thereby adapted to quickly rotate each chuck screw of a multiple chuck as the article which has been machined is brought to a position to be removed and a new blank casting substituted therefor.

A further important object is the provision of compressed air impelled means to rotate the chuck screws of a multiple chuck, which means are attached to a standard screw and chuck machine, said compressed air operating means being automatically operable by means on the feed cam drum of said machine to cause said chuck screw rotating means to be actuated.

Other and further important objects of this invention will be apparent from the disclosures in the specification and the accompanying drawings.

This invention (in a preferred form) is illustrated in the drawings and hereinafter more fully described.

On the drawings:

Fig. 1 is a side elevational view of one end of an automatic chucking machine shown with parts broken away and showing the manner in which my device is attached thereto.

Fig. 2 is a view taken from the right of Fig. 1 showing the manner of slidably mounting my pressed air cylinders.

Fig. 3 is a detailed view of the means whereby my device is attached to the slidable turret shaft so as to slide therewith.

Fig. 4 is a view taken on line IV—IV of Fig. 3.

Fig. 5 is a cross sectional view taken on line V—V of Fig. 1 and showing the rotatable chuck from its end position.

Fig. 6 is an enlarged sectional view of slidable mounting means which is attached to the outside of the rotatable chuck as shown in Fig. 1.

Fig. 7 is a perspective view of the frame for the slidable rack bars shown from above in Fig. 6.

Fig. 8 is a view looking at bottom of Fig. 6 and showing means for releasably connecting two rack bars.

Fig. 9 is an enlarged perspective view of a hinged member for engaging and moving one of the rack bars shown in Fig. 6.

Fig. 10 is an enlarged view of the mounting bar in which the rack engaging element of Fig. 9 is pivoted.

Fig. 11 is a cross sectional view of the rack engaging member shown in Fig. 9 showing its slidable and yieldable head in detail.

As shown on the drawings:

The reference number 10 indicates an automatic chucking machine bed having legs 11, only two of which are shown, and having the usual frame 13. Metal side plates 14 are formed integrally with said machine bed 10 and frame 13 in a manner well known in the art.

A turret shaft 15 of relatively large diameter and extending from beyond one end of the machine and into the rotatable chuck head is rotatably and slidably mounted by means of bushings within a turret barrel 18, said barrel 18 being movably and rotatably mounted in suitable journal boxes 16 and 17 on the machine frame 13. The turret barrel 18 is held in said journal boxes by means of turret barrel caps which are securely bolted in the usual manner to frame 13. On the end of the turret shaft 15 at the center of the machine is centrally mounted a multiple chuck head 19 having a plurality of individual tangentially positioned chucks, each chuck comprising a chuck body 23, a movable outside jaw 20, a movable inside jaw 21, a chuck screw 22 in threading engagement with each of said jaws, a chuck screw plug (not shown), the head of said chuck screw 22 extending above the surface of the chuck head as is well known. The chuck head preferably has five chucks and is adapted to be intermittently rotated one-fifth of a complete turn at a time by mechanism which will be described hereinafter to a position so that the screw of the uppermost chuck will be at the top of the chuck head and in front of and conveniently accessible to the operator. To turn the chuck screw 22 to remove an article which has been subjected to four or less operations by rotatable tools mounted in spindles opposite to the stopping positions of the articles secured in the chucks, it has been a universal practice to use a crank wrench which is turned counter-clockwise to spread the jaws 20 and 21 apart to permit manual removal of the article from the chuck. The crank wrench is turned clockwise to draw the jaws together to grip a newly inserted casting to be machined.

The end of the automatic chucking machine not shown in Fig. 1 includes well known mechanism and a plurality of spindles, preferably four in number where a five-chuck machine is used, said spindles firmly holding respective tools which are quickly rotated, each completing an operation in successive order on the castings held in the four lower chucks of the chuck head. It is believed unnecessary to describe the mechanism of that portion of the machine as it is well known in the art.

As is obvious and well known, such removal of a casting which has been machined and insertion of a new one at the neutral chuck requires a comparatively large amount of time in proportion to the capacity and speed of the machine if it were not limited by the above recited manual operations.

My invention has for its main object the rotation of each chuck screw into open and closed positions by compressed air means, as will be hereinafter more fully described.

The turret shaft 15 with its attached chuck head is slidable longitudinally in the turret barrel 18 by mechanism connected to the source of motive power and which includes a relatively larged feed cam drum 24 which is rotatably mounted in the frame of the machine and below the turret shaft 15 on a rocker shaft 25 which is suitably journalled in said frame. The feed cam drum 24 has secured on its annular surface by screws an annular feed cam 26 and a return cam 27 in substantially parallel relation with one end of cam 26 and spaced apart to slidably receive a downwardly extending turret yoke lock stud 28 formed integral with the turret yoke roll block 29 which is securely mounted on the turret barrel 18. Diametrically opposite the cam 27 on the cam drum 24 is secured a guard cam 30.

The rocker shaft 25 is rotatable intermittently by gearing mechanism in the end of the machine (not shown) in a well known manner. As the feed cam drum rotates in a clockwise direction from the right of Fig. 1, it will be apparent that the stud 28 will be engaged between the adjacent cams aforementioned to cause the turret barrel, the turret shaft and connected parts and the chuck wheel to be moved to the right a predetermined distance as regulated by the position and extent of curve of the feed and return cams. As is well known, during the work of the rotating tools on the articles being machined in the chucks 21, the chuck head, turret shaft and turret barrel together with the connected parts, are in a position so that the tools in said spindle do their work on said articles and wherein the said parts are to the extreme left of a viewer of Fig. 1. As the operations on the articles being machined are completed, automatic means (not shown) causes the feed cam drum 23 to be continuously rotated in clockwise direction to engage the stud 28 to move the last mentioned parts to the right of Fig. 1, thereby also moving the chuck head and parts held thereby away from the working tools. When the operator has removed a completed machined casting from the upper chuck of the multiple chuck head and has locked a new casting to be machined in the chuck from which a finished one has been removed, the cam drum will have rotated to a position to cause the chuck wheel, turret shaft and attached parts to return to extreme left hand position of Fig. 1 wherein the articles in the respective chucks will be operated upon by the rotating tools in the succeeding operations. Simultaneously, an arm 32, which is securely mounted near the outer end of the rocker shaft 25, will be rotated a predetermined distance to engage one of the recesses of the star wheel 33 which is securely and concentrically mounted on the turret barrel 18, to cause said star wheel, turret barrel, turret shaft and multiple chuck head to rotate a predetermined distance so that each of the articles being machined will register and be opposite the succeeding tool and spindle. As soon as said parts have moved to one of the positions above described, the lever 31 is rotated through shaft 25 by cam mechanism not shown to cause said lever to engage one of the recesses in the index wheel 51, thereby holding the movable parts above mentioned, including the chuck head in proper position for machining of the castings in the chucks.

A rack frame 34, shown in detail in Fig. 7 and having longitudinal grooves for a pair of slidable racks is secured on the outside of the chuck head 19 in such a position so that its bottom aperture 35 will lie about the head of each of the chuck screws 22 and so that the longitudinal grooves will be parallel with the turret shaft 15. A pinion 36 having a central aperture adapted to fit snugly about the head of the screw 22 is rotatable within a suitable recess in said frame 34 as shown in Fig. 8. A rack bar 37 of predetermined length is slidable in the groove of the rack frame 34 and meshes with the pinion 36. The end of the rack bar 37 adjacent the back of the chuck head has a recess 38 therein to conveniently receive the tapered end of a yieldable member which will be later described. The other groove of said rack frame 34 carries a relatively short rack bar 39 which is adapted to mesh with the pinion 36 and which has a groove in which is pivoted one end of an L-shaped hook 40, for a purpose which will appear hereinafter. A small coil spring 41 mounted in said groove and beneath said hook 40 is adapted to normally hold said hook in open position out of engagement with a movable rack bar to be hereinafter described.

A metal base 42 is securely mounted on the top of the machine frame above the turret shaft by means of bolts as clearly shown in Fig. 2. Said base has an inclined upper face 43 which is on a plane approximately sixty degrees from the horizontal and has therein a longitudinal dovetail groove which is wider at its bottom for the convenient mounting of a dovetailed boss formed integral with a cylinder block 43', said mounting means permitting said cylinder block and attached parts to slide longitudinally therein with respect to the machine frame. The cylinder block 43' is so formed that it will contain two cylinders and has a cylinder head 44 secured to one end thereof in the usual manner, said cylinder head having flanged apertures, in which apertures and cylinders are slidably mounted connecting rods 45 and 46 of slidable pistons (not shown).

The opposite end of said cylinder block is sealed by a sealing plate 47 in the usual manner, said plate 47 having integral bosses 48, 49 and 50 and said bosses having threaded apertures to provide means whereby said cylinder block is attached to the slidable turret shaft of the chucking machine so as to be moved therewith in its slidable mounting above described.

Index wheel 51 of comparatively large size is securely mounted upon the outer end of the turret shaft 15 in a manner well known in the art. As shown in Figs. 3 and 4, a collar 52 is securely mounted by means of a key on the turret shaft 15 adjacent the hub of the index wheel 51. The collar 52 has an annular groove in which is rotatable a collar 53 which comprises two semi-circular portions having integral apertured bosses to provide means whereby they are clamped and held together as will now be described.

One threaded end of each of two substantially L-shaped connecting rods 54 and 55 pass through diametrically opposite apertured bosses of the collar 53 and nuts threaded on said rods and on opposite sides of said bosses hold the two portions of said collar 53 in rotatable position in the groove of the collar 52. The other end of the rod 54 is threaded in the boss 48 while the corresponding end of the rod 55 is threaded in the boss 50, said rods being firmly locked in said bosses by lock nuts 56 and 57 respectively.

A brace rod 59 having one end threadingly engaged in the boss 49 and locked therein by means of lock nut 58, has threaded on its other end the shank portion of a bifurcated fork providing mounting means for a small rotatable wheel 61 which is rotatably mounted therein. The brace rod 59 is of such length that the wheel 61 will ride on the periphery of index wheel 51 and constantly serve as a brace for the cylinder block to resist the recoil force exerted in the rotation of the respective chuck screws.

Short connecting links 62 and 63 each have one end thereof connecting to the ends of the piston rods 45 and 46 respectively, and at right angles to said piston rods. The other end of the connecting link 62 has firmly mounted therein one end of a rack bar 64 having a recess as shown in dotted lines in Fig. 6. Said connecting link 62 and rack bar 64 are positioned so that when impelled outwardly by its connected piston, said rack bar 64 will push against the end of the short rack bar 39 to move said rack bar 39 in counter-clockwise direction to open the chuck jaws. As soon as the rack bar 64 starts pushing the short rack bar 39, the hinged hook 46 will be pressed downwardly from the dotted line position shown in Fig. 6 and into the recess in the end of the rack bar 64 by engagement of the wall of the rack frame 34 which will hold said hook in rack connecting position until the rack bars are again retracted to the positions shown in Fig. 6. It will be apparent that the major purpose of the short rack bar 39 is to be in mesh with the pinion 36 when the rack bar 64 is retracted so as to prevent injury by the rack bar 64 to the teeth of the pinion 36.

The short metal connecting link 63 is securely mounted at right angles on the piston rod 46 and its other end is apertured to provide rigid mounting means for a short bar 66 which is mounted parallel to the piston 46, thereby forming an offset. The free end of the bar 66 is beveled and bifurcated as clearly shown in Fig. 10. A lever 67 has one reduced end thereof hingedly pivoted in the bifurcated end of the bar 66, the shank portion of said lever being beveled to correspond to the end of the bar 66 so that the lever 67 could be moved in but one direction. A small wire spring 68, which is mounted about one end of said last mentioned pivot, has one end thereof pressing against a small stud 69 on the side of the lever 67 and normally holds said lever in parallel with the piston rod 46 and as shown in Fig. 1. The free end of the lever 67 is reduced to form a stud 70 as shown in Fig. 11.

A metal head cap 71 is slidably mounted on the stud 70, a spiral spring 72 being positioned about said head cap 71 to normally hold said head cap in projected position as shown in Fig. 11. The opposite end of said spring presses against the shoulder at the juncture of the stud 70. The side of the head cap 71 has a short slot 72' therethrough which is slidable about a short stud 73 mounted in the end of the stud 70, said stud 73 limiting longitudinal movement of the head cap 71. When the compressed air system hereinafter described is operated to cause the piston rod 46 and attached parts to be projected outwardly from the cylinder block, the head cap 71 will strike the recess 38 in the end of the rack bar 37. The resilient mounting of the head cap 71 as above described will partially absorb the shock of the sudden blow imparted by movement of the piston and connected rods and will thereby prevent injury to the teeth of the pinion 36 and rack bar 37 and will also prevent injury to the chuck screw 22 and the threads thereof. Such yieldingly mounted head cap will also compensate for slight variation in the size of the articles which have been placed in the chuck jaws to be machined, at the same time clamping such articles securely.

A two-way air valve 74 is securely mounted on the chuck machine frame at a point convenient to the operator's hand as shown in Fig. 1, said valve having a hand lever 81 for convenient manual operation. One opening of said valve 74 is connected by an air line 75 to the forward end of the lower cylinder of the cylinder block 43' and is also connected to the rearward end of the adjacent upper cylinder by an air pipe 76, said air pipes being properly mounted in ports in the sides of said cylinders. The opposite side of said air valve 75 is similarly connected to the forward end of the upper cylinder by air pipe 77 and to the rearward end of the lower cylinder by air pipe 78. The central air inlet port of said two-way valve is connected by a suitable air pipe 79 to a source of compressed air.

It will be apparent that by turning the valve to a position so that the air will enter through the pipe 76 into the lower cylinder and through pipe 75 into the upper cylinder, the pistons and connected parts will be in the position shown in Fig. 1.

Upon turning the valve to the opposite position the compressed air will be permitted to escape through the valve from in front of the upper piston and from behind the lower piston through pipes 75 and 76 and the air from the compressed air source will flow into the upper cylinder behind the piston to project piston rod 45 outwardly and will also enter the lower cylinder through tube 78 to simultaneously retract the piston 46 and connected parts to rotate pinion 36 in counter-clockwise position to open the jaws of the chuck to permit manual removal of the machined article.

Upon substitution of a new blank in the jaws of the chuck the operator need only operate the valve 74 to cause compressed air to enter the air pipes 75 and 76 to project piston rod 46 and retract piston rod 45 and connected parts to rotate the pinion to lock said chuck jaws about the article to be machined. After this is done, the chuck head 19 will be rotated one-fifth of its circumference by mechanism heretofore described so that the next pair of rack bars 37 and 39 will be in a position so that the rack bar 66 will strike and push the rack bar 39 to rotate its respective pinion 46 and thereby unlock the next chuck to permit manual removal of the casting which has been machined. Thereafter a new blank casting is inserted and the locking operation above described is repeated.

Due to the engagement of the head cap 71 on each respective rack bar 37 after the new article to be machined has been locked in its chuck, the rotation toward the operator of the chuck head will cause the hinged lever 67 to be thrown in a direction tangential to said chuck head and against the action of the small spring 68. As soon as the beveled ends of the rack frame 34 have passed the end of the diverted lever 67 the action of spring 68 will return the lever 67 to normal rack engaging position to engage the next rack 37.

Mounted upon and near the edge of the cam drum 24 and secured by screws or the like is a small metal block 80 which is positioned so that in each revolution of the feed cam drum 24 it will strike a small wheel 81 which is pivoted on the end of the valve lever 81, said valve lever being extended a predetermined distance in the direction opposite to the hand portion thereof. As the feed cam drum 24 rotates, the block 80 will strike and move horizontally the valve lever 81 to open said valve to cause the automatic mechanism heretofore described to release a casting in the chuck. The block 80 is so positioned that it will operate when the chuck head 19 has rotated to place the chuck holding a machined casting in neutral position where it is opened by reciprocation of said cylinders and attached parts. A similar block could be positioned at a position on the cam drum 24 substantially diametrically opposite to the block 80 so as to effect a closing of the chuck jaws a predetermined distance after the opening of said jaws, such interval to be sufficient to permit manual removal of a casting and substitution of another casting.

I am aware that many changes may be made and numerous details of construction may be varied through a wide range without departing from the principles of this invention, and I therefore do not purpose limiting the patent granted hereon otherwise than necessitated by the prior art.

I claim:

1. In combination with an automatic chucking machine head and indexing means whereby said chuck head is intermittently rotated; of a pinion on each of said chuck screws; a plurality of guide members on said chuck head, each mounted adjacent its respective pinion; rack bars slidably mounted in each of said guide members; a pair of adjacent compressed air cylinders; a slidable piston and piston rod in each of said cylinders; a rack bar connected to the other end of one of said piston rods; a yieldable element on the end of the other of said piston rods; a manually controlled compressed air circuit connecting manually operable means for selectively controlling said air circuit to the respective ends of said cylinders in series; the compressed air being adapted to project one piston and piston rod and retract the other piston and piston rod to successively and intermittently rotate one of said pinions in each direction to successively open and close the chuck controlled by said pinion when the chuck has been moved to a predetermined point.

2. The combination with an automatic chuck machine having a plurality of screw operated chucks mounted in a rotatable chuck head and means for intermittently rotating said head; of a pinion on each of said chuck screws; a slidable rack bar meshing with said pinion; mounting and guiding means for said rack bars; a pair of compressed air cylinders; a slidable piston and piston rod in each of said cylinders; a rack bar connected to one of said piston rods; a yieldable hinged element on the end of the other piston rod; air conduits connecting the opposite ends of said cylinders with a compressed air source; a manually operable valve in said conduits, and means on said machine adapted to intermittently operate said valve to cause intermittent and successive movement of said slidable rack bars to cause successive opening and closing of each chuck when said chuck is moved to a predetermined point.

3. The combination with an automatic chucking machine having a plurality of screw operated chucks mounted in a rotatable chuck head, and having index means for intermittently rotating said chuck head to successively present each of said chucks to a predetermined point; of a pinion on each of said chuck screws; a pair of rack bars slidably mounted on said chuck head on opposite sides of each pinion and meshing therewith; a pair of compressed air cylinders mounted on said machine; a slidable piston and piston rod in each of said cylinders; a rack bar connected to the outer end of one of said piston rods; a yieldable element on the end of the other piston rod adapted to strike one of said first mentioned rack bars when the chuck is at a predetermined point; compressed air conduits connecting said pistons together and with a compressed air source; a manually operable valve adapted to be operated to selectively project and selectively retract said pistons, said projection and retraction being adapted to cause longitudinal movement of said first mentioned rack bars to rotate the pinion and chuck screw when the chuck head has been moved to place said rack bars in a predetermined position.

4. The combination with an automatic chucking machine having a chuck head; a plurality of screw operated chucks therein, a rotatable and slidable turret shaft and a rotatable feed cam drum; of a pinion on each of said chuck screws; rack bars in mesh with said pinion and slidably mounted on said chuck head; a pair of cylinders mounted on the machine frame and slidable with said turret shaft; a collar rotatable about one end of said turret shaft; rods connecting said cylinders and said collar; a piston in each of said cylinders; a movable member connected to each of said pistons adapted to alternately engage its respective rack bar of each chuck when the same has been moved to a predetermined point; a hinged member attached to the end of said movable members; a head resiliently mounted on the end of said hinged member adapted to contact its respective rack bar to rotate said pinion in one direction; air conduits connecting said pistons and a compressed air source, and a manually operable valve in said air lines, said pistons being selectively and alternately projectible to alternately retract and project the rack bars to rotate said pinion and chuck screw of each chuck successively moved to a predetermined position.

5. In combination with an automatic chucking machine having a rotatable chuck head; a plurality of screw operated chucks therein; means for indexing the head to successively present each chuck to predetermined position; a rotatable and slidable turret shaft and a feed cam drum, of a pinion on each of said chuck screws and adapted to rotate the same; rack bars slidably mounted on diametrically opposite sides of said pinion; a pair of adjacent cylinders slidably mounted on the machine frame; a collar on said turret shaft; rods connecting said collar and said cylinders; a piston and piston rod in each of said cylinders; a hinged member on the end of one of said rods adapted to engage one of said rack bars; a compressed air line connecting the opposite ends of said cylinders, said chuck head indexing means being adapted to successively bring said pinion and rack bars in line with said piston rods; a valve in said air line adapted to permit manual selective and alternate projection of said piston rods to cause rotation of the chuck in either direction, and means on said cam drum adapted to actuate said valve to cause said chuck screw to be rotated to open or close the chuck.

6. In combination with an automatic chucking machine having a rotatable chuck head; a plurality of screw operated chucks therein; a rotatable and slidable turret shaft and a feed cam drum, of a pinion on each of said chuck screws and adapted to rotate the same; rack bars slidably mounted on diametrically opposite sides of said pinion; a pair of adjacent cylinders slidably mounted on the machine frame; a collar on said turret shaft; rods connecting said collar and said cylinders; a piston and piston rod in each of said cylinders; a hinged member on the end of one of said rods adapted to engage one of said rack bars; a compressed air line connecting the opposite ends of said cylinders in series; a two-way valve in said air line adapted to permit manual selective and alternate projection of said piston rods to rotate the pinion in either direction, and means on said cam drum adapted to actuate said valve to cause said chuck screw to be rotated to open the chuck, said chuck head being rotatable with said turret shaft to cause each pair of rack bars to be successively engaged and each respective chuck screw to be rotated by movement of said piston rods and attached parts.

7. The combination with an automatic chucking machine having a slidable and rotatable turret shaft; a multiple chuck head; means for rotating and indexing said chuck head; a plurality of screw operated chucks in said head and a feed cam drum, of a pinion on each of said chuck screws; slidably mounted rack bars in mesh with each pinion; cylinders on said frame having pistons and piston rods therein, said indexing means being adapted to successively move said chuck screw pinions and rack bars in line with said piston rods, the movement of said piston rods causing rotation of said pinion and chuck screw, and a manually controlled compressed air system connecting said cylinders adapted to selectively reciprocate said pistons.

8. The combination with an automatic chucking machine having a slidable and rotatable turret shaft, a multiple chuck head, means for rotating and indexing said head, a plurality of screw operated chucks in said head and a feed cam drum, of a pinion on each of said chuck screws; slidably mounted rack bars normally in mesh with each pinion; cylinders on said frame having pistons and piston rods therein, said head indexing means being adapted to successively move said chucks in line with said piston rods and the movement of said rods effecting rotation of each pinion; a compressed air system connecting said cylinders and a source of compressed air whereby said pistons and rack bars may be selectively reciprocated; a manually operable valve in said air system, and means on said cam drum adapted to intermittently actuate said valve.

9. The combination with an automatic chucking machine having a slidable and rotatable turret shaft, a multiple chuck head, a plurality of screw operated chucks in said head, and a feed cam drum, of a pinion on each of said chuck screws; slidably mounted rack bars normally in mesh with said pinion; cylinders on the machine frame having pistons and piston rods; a rack bar connected to the upper of said piston rods and adapted to mesh with said pinion; a hinged member pivotally secured to the lower piston rod; a yieldably mounted cap on said hinged member adapted to strike the end of the other of said slidably mounted rack bars and move the same longitudinally, said hinged member being adapted to be moved on its pivot by rotation of said chuck head, and a compressed air system connecting opposite ends of said cylinders, and a compressed air source, and a manual operable valve in said air system adapted to permit alternate reciprocation of said pistons and connected parts to cause rotation of each pinion and chuck screw.

10. In combination with a chucking machine having a rotatable chuck head and a plurality of screw operated chucks mounted therein and having means for intermittently rotating said chuck head to successively press each of said chucks to a predetermined position, a pinion on each of said chuck screws; and manually controlled compressed air operated means for successively rotating said pinion and chuck screw when the chuck controlled thereby has been moved to a predetermined working position, said last mentioned means comprising a pair of rack bars slidably about each pinion; means for holding said rack bars in mesh with its pinion; a pair of compressed air cylinders and pistons slidable therein, means connected to said pistons adapted to engage said rack bars to move the same; compressed air conduits connecting said cylinders and a compressed air source; and means for selectively controlling said compressed air to cause movement of said rack bars in opposite directions to effect successive opening and closing of a chuck when said chuck has been moved to a predetermined position.

11. In combination with a chucking machine having a rotatable chuck head and a plurality of screw operated chucks mounted therein and having means for intermittently rotating said chuck head to successively press each of said chucks to a predetermined position, a pinion on each of said chuck screws; means for rotating said chuck screw and pinion comprising a pair of rack bars slidably mounted in mesh with said pinion; a pair of cylinders mounted on said machine, each having a slidable piston therein; means connected on one of said pistons adapted to engage and to rotate said pinion in one direction when projected; means on the other of said pistons adapted when projected to engage the other of said rack bars to rotate said pinion in the opposite direction; and manually operable means for selective and intermittent movement of said pistons.

In testimony whereof I have hereunto set my hand this 26th day of August, 1921, in Chicago, Cook County, Illinois.

FRANK KREJCI.